Sept. 22, 1959     J. J. AYRES ET AL     2,905,069

TURRET LENS INDEXING AND FOCUSING APPARATUS

Filed July 31, 1953     2 Sheets-Sheet 1

INVENTOR.
JAY J. AYERS &
CHARLES T. COLE, JR

BY *Morris B. Rabin*

ATTORNEY

United States Patent Office 2,905,069
Patented Sept. 22, 1959

2,905,069

TURRET LENS INDEXING AND FOCUSING APPARATUS

Jay J. Ayres, Sicklerville, N.J., and Charles T. Cole, Jr., Havertown, Pa., assignors to Radio Corporation of America, a corporation of Delaware Application July 31, 1953, Serial No. 371,494

5 Claims. (Cl. 95—44)

This invention relates to camera lens systems, and more particularly to an improved system for selecting and focusing the lenses on a turret of a motion picture or television camera.

In one design of a motion picture camera to be used in conjunction with a television camera for simultaneous photography, two servo-systems are employed, one to control the mechanism for indexing the turret or for selecting a particular lens on the turret, and the other to control the focusing mechanism which involves the rotating of focusing cams on each of the lenses on the turret. In this design, the two mechanisms operate independently of each other which presents at least one major disadvantage. When the turret is rotated for indexing, the focusing cams of all of the lenses on the turret are also rotated, thus putting a large and unnecessary load on the indexing drive mechanism. This is due to the fact that, during indexing, the focusing gear, which meshes with the focusing cams of the lenses, is locked with the focusing drive mechanism; hence, during indexing, the focusing cams rotate around this focusing gear. In order to overcome this additional load on the indexing mechanism, an unnecessarily large and complex driving mechanism must be built into the system.

Accordingly, it is an object of this invention to provide an improved system for indexing and focusing the turret lenses on a motion picture or television camera.

Another object of this invention is to provide an improved mechanism for indexing the lens turret of a motion picture camera which eliminates the high friction load due to the focusing of a number of lenses.

The present invention achieves these objects by introducing a differential gear train into the focusing drive mechanism. This permits the indexing drive mechanism to drive the focusing gear at the same rotational speed as the turret itself, during indexing, hence eliminating any rotation of the focusing cams and the corresponding high friction load.

Further objects and advantages of this invention, as well as a better understanding of the organization and operation thereof, will become apparent from the following description considered in conjunction with the accompanying drawings in which.

Figure 1:
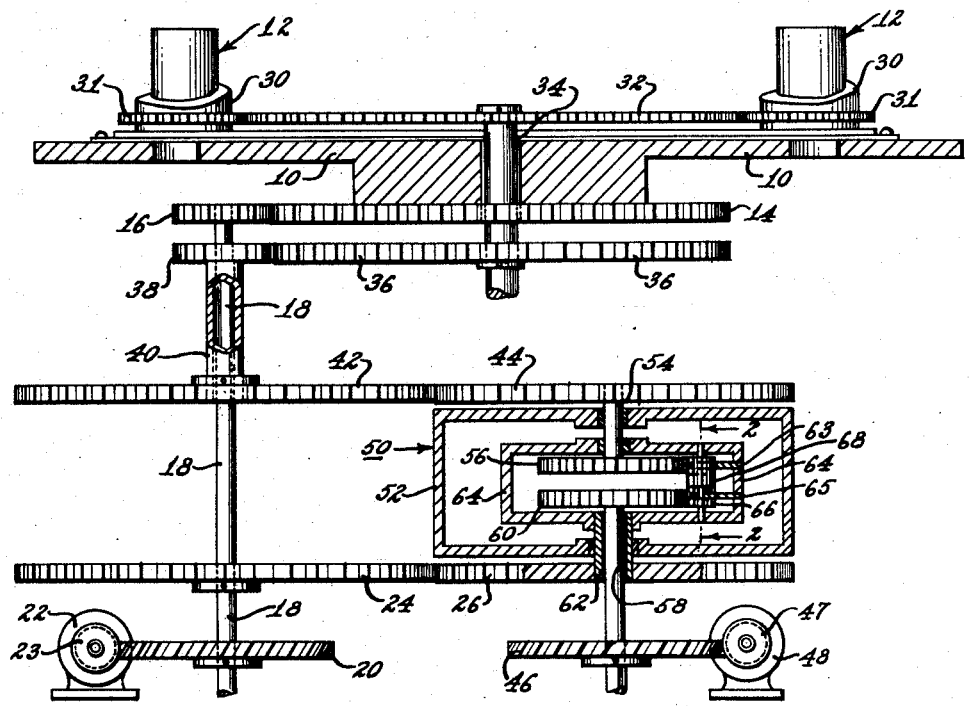
Figure 1 is a diagrammatic view, partly in section, of an indexing and focusing system according to the invention.

Referring in more detail to Figure 1, the turret 10 has a plurality of lens assemblies 12 mounted on it, two of which are shown. An indexing gear 14 is secured to the turret 10 and is driven by an indexing pinion 16. The indexing pinion 16 is connected through a shaft 18 to a worm gear 20 which is driven by the indexing motor 22 through a worm 23.

The lenses 12 are focused by focusing cams 30 which are a part of each lens assembly. Pinion teeth 31 on the focusing cams 30 mesh with a focusing gear 32 which is secured on a shaft 34. The shaft 34 also carries a gear 36 which, in turn, is driven by a focusing pinion 38. The focusing pinion 38 is connected by means of a hollow shaft 40 and a gear train composed of meshing gears 42 and 44 to the output shaft 54 of differential 50. A worm 47 on the shaft of a focusing motor 48 drives a worm gear 46 which is connected to an input shaft 58 of the differential 50. The shaft 18 of the indexing mechanism is connected through a gear train composed of meshing gears 24 and 26 to a hollow second input shaft 62 of the differential 50.

The differential 50 is of a type well known in the art and consists of a housing 52 which is connected to a suitable stationary mounting, an output shaft 54, an output gear 56, an input shaft 58, an input gear 60, a hollow input shaft 62 and a cage 64. The housing 52 provides a bearing for the output shaft 54 and for the hollow input shaft 62. The input shaft 58 is carried on a bearing surface within the hollow shaft 62. The cage 64 is mounted for rotation on shaft 62 and carries a pair of idlers 66 and 68 mounted to mesh with each other and with the input and output gears 60 and 56.

Figure 2:
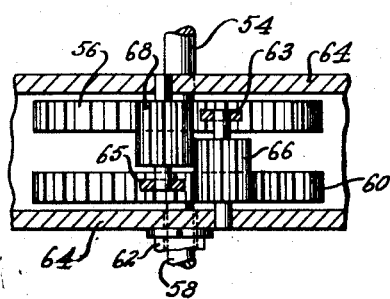
Figure 2 is a fragmentary view of the differential gear train looking in the direction 2—2 of Figure 1.

Figure 2 shows an enlarged view of a portion of the differential mechanism to further illustrate the relationship of the input gear 60, output gear 56, the cage 64 and the idlers 66 and 68 mounted thereon. The shafts of the latter are rotatably carried by brackets 63 and 65 extending from the cage 64.

During focusing of the lenses, the focusing motor 48 drives the input shaft 58 and input gear 60. Since the indexing mechanism is not operating at this time, the cage 64 which is keyed to the hollow input shaft 62 is stationary. Hence the input gear 60 drives the output gear 56 through the idlers 66 and 68. During the indexing of the turret 10, the indexing motor 22 drives the hollow input shaft 62 and the cage 64. Since the focusing motor 48 is not operating at this time, the input shaft 58 and gear 60 are stationary; hence the cage 64, rotating around the input gear 60, drives the output gear 56 through the idlers 66 and 68.

Figure 3:
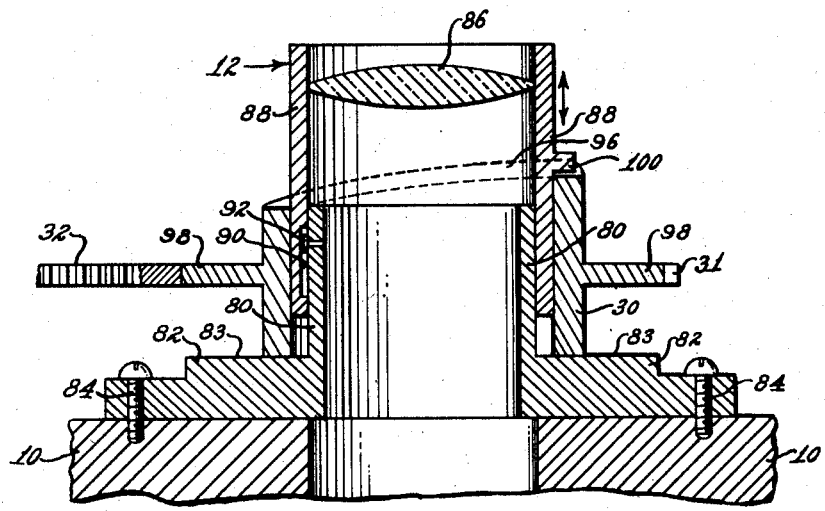
Figure 3 is a fragmentary view in section of a turret showing the details of a lens assembly.
Figure 4:
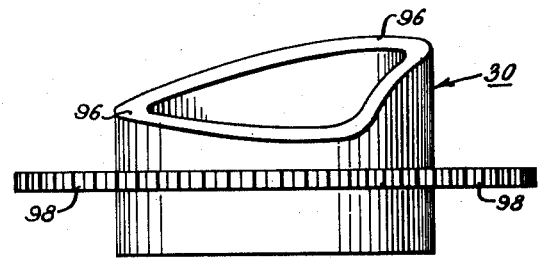
Figure 4 is a view of a focusing cam as used in the lens assembly of Figure 3.

Figure 3 illustrates more in detail and to an enlarged scale a lens assembly 12 which may be mounted on the turret 10 of the above described apparatus. An inner sleeve 80 having a base flange 82 is fixed to the turret 10 by means of screws 84, for instance. The lens 86 is mounted in an outer sleeve 88 which is slidably mounted on the inner sleeve 80. A longitudinal groove 90 is provided on the inner surface of the sleeve 88 to receive the head of a pin 92 which extends from the outer surface of the inner sleeve 80. Engagement of the pin 92 with the groove 90 permits the outer sleeve 88 to slide longitudinally with respect to the inner sleeve 80 but does not permit relative rotation of the two sleeves. The focusing cam 30 is also in the form of a sleeve. It has a cam surface 96 which is formed on the upper edge of the cam 30 and a cam pinion 98 which may be an integral extension of the cam 30. The pinion teeth 31 are formed on the pinion 98. The focusing cam is illustrated in Figure 4. The focusing cam 30 is slidably mounted over the outer surface of the lens holding sleeve 88 and rests against the bearing surface 83 of the flange 82. A cam follower 100 comprising a pin-like extension from the outer surface of the lens holding sleeve 88 rides on the cam surface 96. When the cam 30 is rotated through the cam gear 98 by the focusing gear 32, it causes the lens holding sleeve 88 to move longitudinally as indicated by the two-headed arrow in Figure 3, resulting in the desired focusing.

Referring again to Figure 1, during the focusing operation, the focusing motor 48 drives through the differential 50 by means of input shaft 58 and output shaft 54, then through the above described mechanism to drive focusing gear 32 which rotates all of the focusing cams 30. During the indexing operation, the indexing motor 22 drives the turret through the shaft 18 and indexing pinion 16. The indexing mechanism is linked to the differential 50 as previously described and drives through the differential by means of hollow input shaft 62 and output shaft 54 to again drive the focusing gear 32. By means of the differential, the focusing gear 32 is driven at the same rotational speed as the turret 10. Hence, there is no rotation of the focusing cams relative to the turret, and the high friction load resulting from the focusing of a number of lenses is not carried by the indexing drive motor.

What is claimed is:

1. In combination with a camera lens turret having mounted thereon a plurality of lenses, each having a focusing means, and a focusing gear rotatably mounted with respect to said turret and operatively engaging each of said focusing means; first and second drive sources; a mechanism coupled to said first drive source for driving the turret to select one of the lenses, a mechanism coupled to said second drive source for driving the focusing gear to focus the lenses, and a drive mechanism continuously and operatively connecting said turret drive source to said focusing gear mechanism whereby said turret drive source drives said focusing gear and said turret at the same angular velocity when said focusing drive source is inoperative.

2. The combination defined in Claim 1 wherein said focusing gear mechanism includes a differential gear train having two inputs and one output, said turret drive source and said focusing drive source being coupled respectively to said two differential inputs, and said focusing gear being coupled to said differential output.

3. A system for selecting and focusing a plurality of lenses mounted on a camera turret in which all of the lenses are operatively engaged by a common focusing gear rotatably mounted with respect to said turret, said system comprising a first drive source for driving the turret to select one of the lenses, a mechanism for coupling said turret drive source to said turret, a second drive source for driving the focusing gear to focus the lenses, a mechanism for coupling said focusing drive source to said focusing gear, and a drive mechanism continuously and operatively connecting said turret drive source to said focusing gear mechanism whereby said focusing gear and said turret are driven at the same angular velocity by said turret drive source when said focusing drive source is inoperative.

4. A system for selecting and focusing a plurality of lenses mounted on a camera turret in which all of the lenses are operatively engaged by a common focusing gear rotatably mounted with respect to said turret, said system comprising a first drive source for driving the turret to select one of the lenses, a mechanism for coupling said turret drive source to said turret, a second drive source for driving the focusing gear to focus the lenses, a mechanism including a differential gear train for coupling said focusing drive source to said focusing gear, said differential gear train having one output and two inputs, said differential output being coupled to said focusing gear, one of said differential inputs being coupled to said focusing drive source, and means coupling said turret drive source to the other differential input whereby said focusing gear and said turret are driven at the same angular velocity by said turret drive source when said focusing drive source is inoperative.

5. A system for selecting and focusing a plurality of lenses mounted on a camera turret in which all of the lenses are operatively engaged by a common focusing gear rotatably mounted concentric with said turret, said system comprising a first drive source for rotating the turret to select one of the lenses, a mechanism for coupling said turret drive source to said turret, a second drive source for rotating the focusing gear with respect to said turret to focus the lenses, a differential gear train having one output and two inputs for coupling said focusing drive source to said focusing gear, said focusing gear being coupled to said differential output, one of said differential inputs being coupled to said focusing drive source, and means coupling said turret drive source to the other of said differential inputs whereby said turret drive source drives said turret and said focusing gear at the same angular velocity when said focusing drive source is inoperative.

References Cited in the file of this patent

UNITED STATES PATENTS

| 2,209,156 | Fischer | July 23, 1940 |

FOREIGN PATENTS

| 378,749 | Germany | July 31, 1923 |
| 703,215 | Germany | Mar. 4, 1941 |
| 687,395 | Great Britain | Feb. 11, 1953 |